(No Model.)
L. M. MARR.
FEEDER FOR HORSES.
No. 245,965.             Patented Aug. 23, 1881.
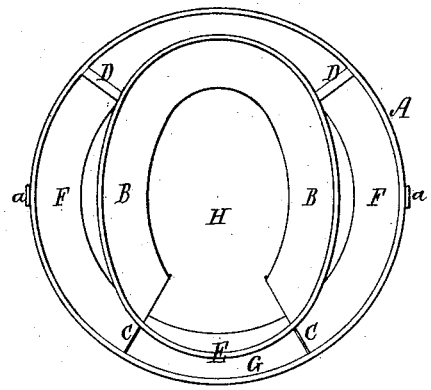
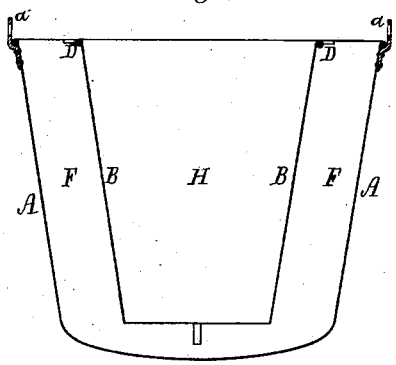 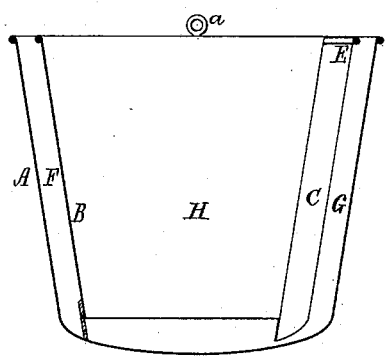
Witnesses
S. N. Piper
E. P. Pratt
Inventor.
Llewellyn M. Marr.
by R. H. Eddy, atty

UNITED STATES PATENT OFFICE.

LLEWELLYN M. MARR, OF BOSTON, MASSACHUSETTS.

FEEDER FOR HORSES.

SPECIFICATION forming part of Letters Patent No. 245,965, dated August 23, 1881.

Application filed July 5, 1881. (No model.)

*To all whom it may concern:*

Be it known that I, LLEWELLYN M. MARR, of Boston, of the county of Suffolk, and State of Massachusetts, have invented a new and useful Improvement in Feeders for Horses or Various other Quadrupeds; and I do hereby declare the same to be described in the following specification, and represented in the accompanying drawings, of which—

Figure 1 is a top view, and Figs. 2 and 3 transverse sections of a feeder of my improved kind.

The nature of my invention is defined by the claim hereinafter presented.

In the drawings, A denotes a bucket or pail or conical-shaped vessel, open at top and provided with perforated ears $a$ $a$ projecting up from its upper edge at opposite parts thereof, such ears being for fastening to the pail a rope or line to go over the head of a horse and support the feeder in its proper position thereon for the animal to feed from it.

Extending around within the pail A is a tapering and elliptical partition, B, which at its ends is connected with the inner surface of the pail by two wings, C, projecting from them to it in manner as represented. The partition does not go quite to the bottom of the vessel A, but terminates within a short distance therefrom, although each of the wings is extended down to such bottom and fastened thereto, and to the partition and inner conical surface of the vessel A. Furthermore, the partition is connected at top with the pail or vessel A by two braces, D D, arranged as represented.

A curved bar or fender, E, extends between the ends of the partition B at their junction with the wings, such feeder being curved in continuation of the upper edge of the partition, (which, as shown, is an elliptical arc,) and is disposed at a short distance from the next adjacent part of the upper edge of the pail, all being substantially as represented, from which it will be seen that there is within the pail or vessel A and around the partition B a horse-shoe-shaped space or chamber, F, to hold grain; and there is also between the two wings a space, G, for air to pass freely into and out of the space H within or bounded directly by the curved partition B.

In eating from the feeder the head of the horse is to extend within the space H, into which grain from the chamber F will gradually flow to supply the place of such as may be eaten by the animal. The fender is to be under his throat and to prevent him from moving his head back, so as to obstruct the free flow of air through and into and out of the space directly between the two wings.

I am aware that it is not new to provide a feed-bag with a grain receptacle or hopper for gradually supplying with grain the bag or space thereof to receive the head of a horse; consequently I do not claim such.

What I claim as my invention is—

The improved feeder, substantially as described, consisting of the pail or vessel A and the wings C C, curved partition B, and fender E, arranged within such vessel and adapted thereto, essentially as set forth.

LLEWELLYN M. MARR.

Witnesses:
 R. H. EDDY,
 E. B. PRATT.